(12) United States Patent
Tilp et al.

(10) Patent No.: US 10,647,364 B2
(45) Date of Patent: May 12, 2020

(54) VEHICLE CAB TILT APPARATUS

(71) Applicant: Deere & Company, Moline, IL (US)

(72) Inventors: Joseph F. Tilp, Dubuque, IA (US); Trisha L. Oyen, Hazel Green, WI (US); Leonard K. Mast, Platteville, WI (US); Stephen Lovas, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 179 days.

(21) Appl. No.: 15/936,504

(22) Filed: Mar. 27, 2018

(65) Prior Publication Data

US 2019/0300076 A1    Oct. 3, 2019

(51) Int. Cl.
  *B62D 33/067*   (2006.01)
  *B62D 33/077*   (2006.01)
  *B62D 33/06*    (2006.01)

(52) U.S. Cl.
  CPC ......... *B62D 33/067* (2013.01); *B62D 33/077* (2013.01); *B62D 33/0604* (2013.01)

(58) Field of Classification Search
  CPC ............ B62D 33/0604; B62D 33/0608; B62D 33/067; B62D 33/071; B62D 33/077
  See application file for complete search history.

(56) References Cited

U.S. PATENT DOCUMENTS

| | | | |
|---|---|---|---|
| 3,847,492 A | 11/1974 | Kennicutt et al. | |
| 3,868,190 A * | 2/1975 | Moore | B62D 33/0604 403/189 |
| 3,940,177 A | 2/1976 | Miers et al. | |
| 3,944,017 A * | 3/1976 | Foster | B62D 33/0608 180/89.15 |
| 4,061,392 A | 12/1977 | Lowder et al. | |
| 4,077,655 A * | 3/1978 | Skahill | B60R 21/131 280/756 |
| 4,483,409 A * | 11/1984 | Fun | B62D 33/067 180/89.15 |
| 4,488,613 A * | 12/1984 | Marjoram | B62D 33/067 180/89.15 |
| 5,368,118 A * | 11/1994 | Hoefle | B62D 33/0604 180/89.12 |

(Continued)

FOREIGN PATENT DOCUMENTS

| | | | | |
|---|---|---|---|---|
| EP | 0972700 A2 * | 1/2000 | ........... | B62D 33/067 |
| EP | 2165920 A1 * | 3/2010 | ........... | B62D 33/067 |
| JP | 2004034811 A * | 2/2004 | | |

*Primary Examiner* — Laura Freedman

(57) ABSTRACT

A vehicle is disclosed which includes a frame with a viscous isolator, a first pin receptor, a retainer, a cab, and a pin. The first pin receptor includes a base portion mounted to the viscous isolator and a top portion movable within a limited range relative to the frame. The retainer is detachably mounted to the frame such that the top portion of the first pin receptor protruding through an aperture in the retainer, and the base portion of the first pin receptor is below the aperture. A pin is received by the top portion of the first pin receptor and a second pin receptor included in a cab, rendering the cab tiltable relative to the frame about the pin. The aperture of the retainer and the base portion of the first pin receptor are each configured such that the base portion cannot pass through the aperture.

18 Claims, 6 Drawing Sheets

(56) References Cited

U.S. PATENT DOCUMENTS

| | | | |
|---|---|---|---|
| 5,551,826 A * | 9/1996 | Todd | B62D 33/067 |
| | | | 180/89.14 |
| 5,590,733 A * | 1/1997 | Ljungholm | B62D 33/0608 |
| | | | 180/89.14 |
| 5,623,410 A * | 4/1997 | Furihata | B60G 17/0195 |
| | | | 180/89.13 |
| 6,374,935 B1 | 4/2002 | Kirschenmann et al. | |
| 7,607,721 B2 * | 10/2009 | Grimes | B62D 33/067 |
| | | | 296/190.01 |
| 8,182,024 B2 | 5/2012 | Hayes et al. | |
| 8,448,735 B2 | 5/2013 | Vierkant et al. | |
| 8,544,939 B2 | 10/2013 | Klein et al. | |
| 8,936,300 B2 | 1/2015 | Davis et al. | |
| 9,193,396 B2 | 11/2015 | Davisdon et al. | |
| 10,112,657 B2 * | 10/2018 | Bumueller | B62D 33/0604 |
| 10,450,010 B2 * | 10/2019 | Tauber | B62D 33/067 |
| 2007/0278811 A1 | 12/2007 | Derham et al. | |

\* cited by examiner

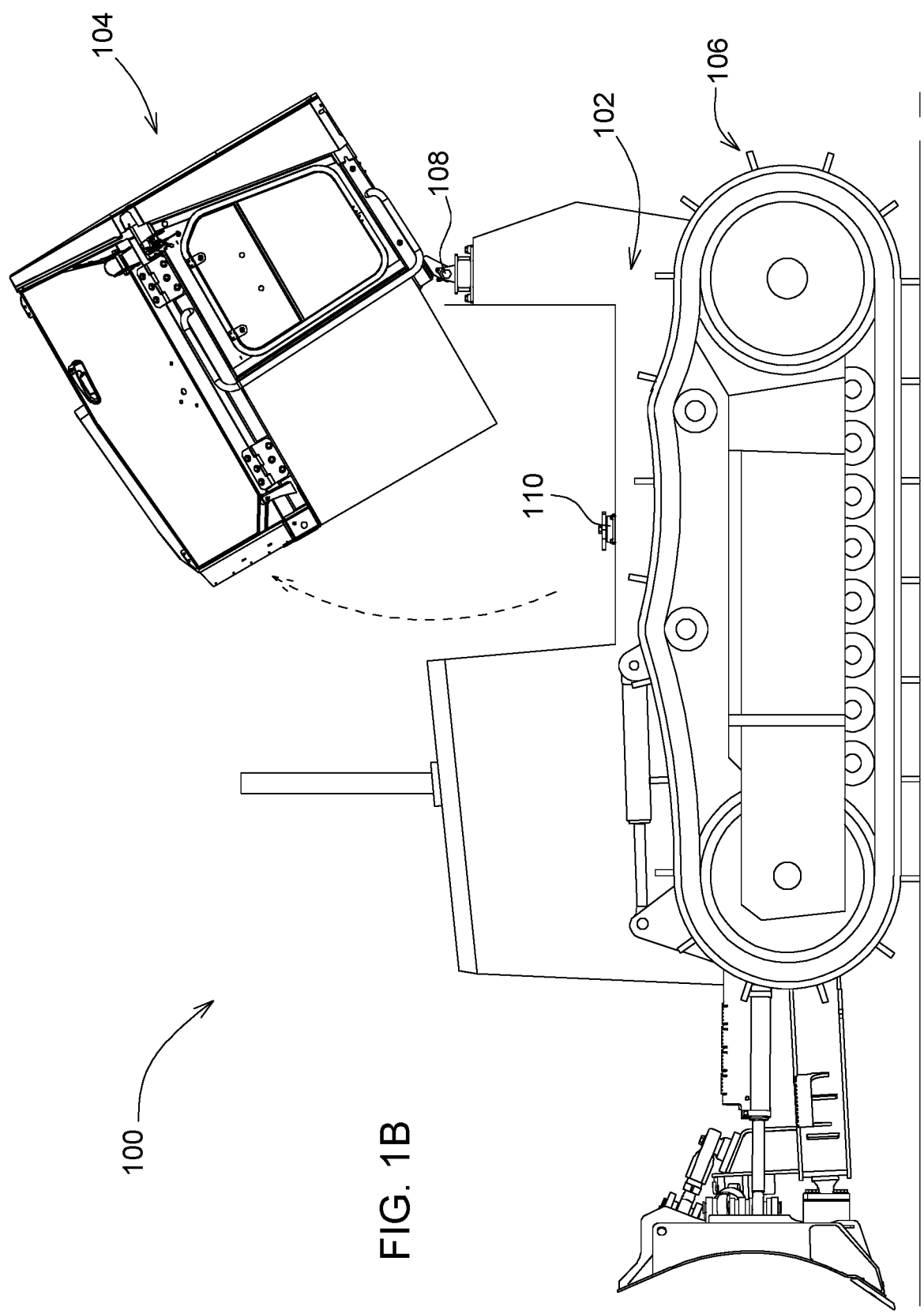

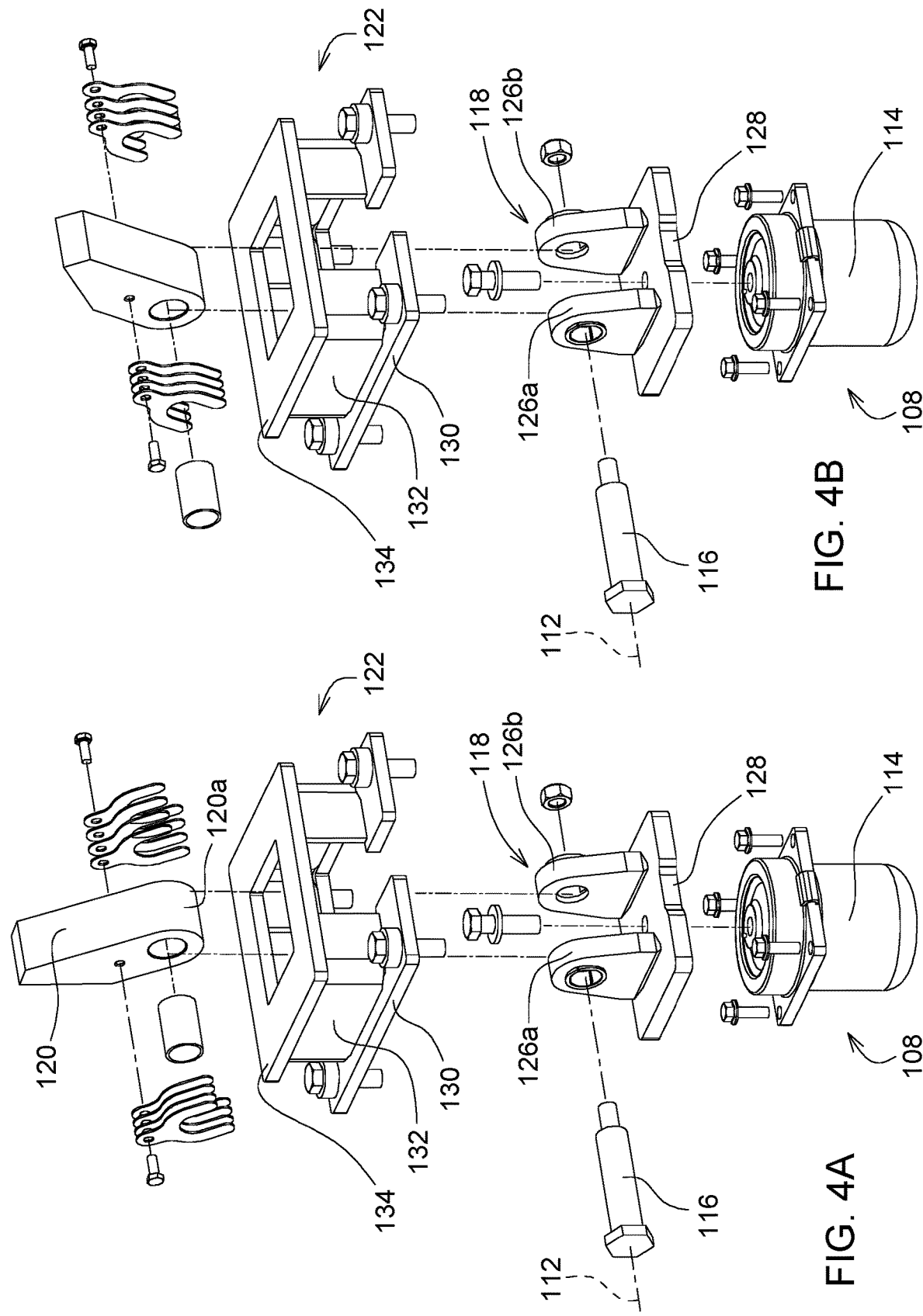

VEHICLE CAB TILT APPARATUS

FIELD OF THE DISCLOSURE

The present disclosure generally relates to an apparatus for connecting a vehicle cab to a chassis in a way that permits the cab to be tilted relative to the chassis between an operation position and a service position.

BACKGROUND

Vehicles may include a number of components, including engines, transmissions, hydraulics, and electronics, positioned inside a frame or chassis. These vehicles may also include a cab mounted to the frame in a position directly over such serviceable components or in a manner that closes off a gap in the frame through which such components may be inspected or serviced. For these vehicles, tilting the cab relative to the frame to a service position may enable these components to be more easily accessed, inspected, or serviced. A vehicle cab tilt apparatus may be included in these vehicles to provide this tiltable connection.

SUMMARY

According to an aspect of the present disclosure, a vehicle may include a frame, a viscous isolator mounted to the frame, a first pin receptor, a retainer, a cab, and a pin. The first pin receptor includes a base portion mounted to the viscous isolator and a top portion movable within a limited range relative to the frame. The retainer is detachably mounted to the frame such that the top portion of the first pin receptor protruding through an aperture in the retainer, and the base portion of the first pin receptor is below the aperture. The cab includes a second pin receptor. A pin is received by the top portion of the first pin receptor and the second pin receptor, rendering the cab tiltable relative to the frame about the pin. The aperture of the retainer and the base portion of the first pin receptor are each configured such that the base portion cannot pass through the aperture.

According to another aspect of the present disclosure, the vehicle may include a frame, a viscous isolator mounted to the frame, a clevis, a cab, a pin, and a retainer. The clevis includes a first ear, a second ear, and a baseplate. The first ear and the second ear are each connected to the baseplate, which in turn is mounted to the viscous isolator. The first ear and the second ear are each movable within a limited range relative to the frame. The cab includes a third ear, and a pin received by the first ear, second ear, and third ear, which renders the cab tiltable relative to the frame about the pin. A retainer is detachably mounted to the frame and includes an aperture. The retainer and the frame cooperate to surround the baseplate of the clevis, and the aperture of the retainer and the baseplate are configured such that the baseplate cannot pass through the aperture.

According to another aspect of the present disclosure, a frame of a vehicle may be connected to a cab of the vehicle by two or more of the above assemblies of viscous isolators, pin receptors, pins, and retainers.

According to another aspect of the present disclosure, there may be a minimum clearance between the retainer and the first pin receptor so as to enable the cab to rotate or vibrate relative to the frame without the retainer and the first pin receptor coming into contact. This clearance may be greater than 4 millimeters and the cab may rotate 45 degrees or more relative to the frame.

The above and other features will become apparent from the following description and accompanying drawings.

BRIEF DESCRIPTION OF THE DRAWINGS

The detailed description of the drawings refers to the accompanying figures in which:

FIG. 1B is a left side elevation view of the vehicle with the cab in a service position.

FIG. 4A is a partially exploded view of the cab mount with a pin removed and the cab in the operation position.

FIG. 4B is a partially exploded view of the cab mount with the pin removed and the cab in the service position.

DETAILED DESCRIPTION

Figure 1A:
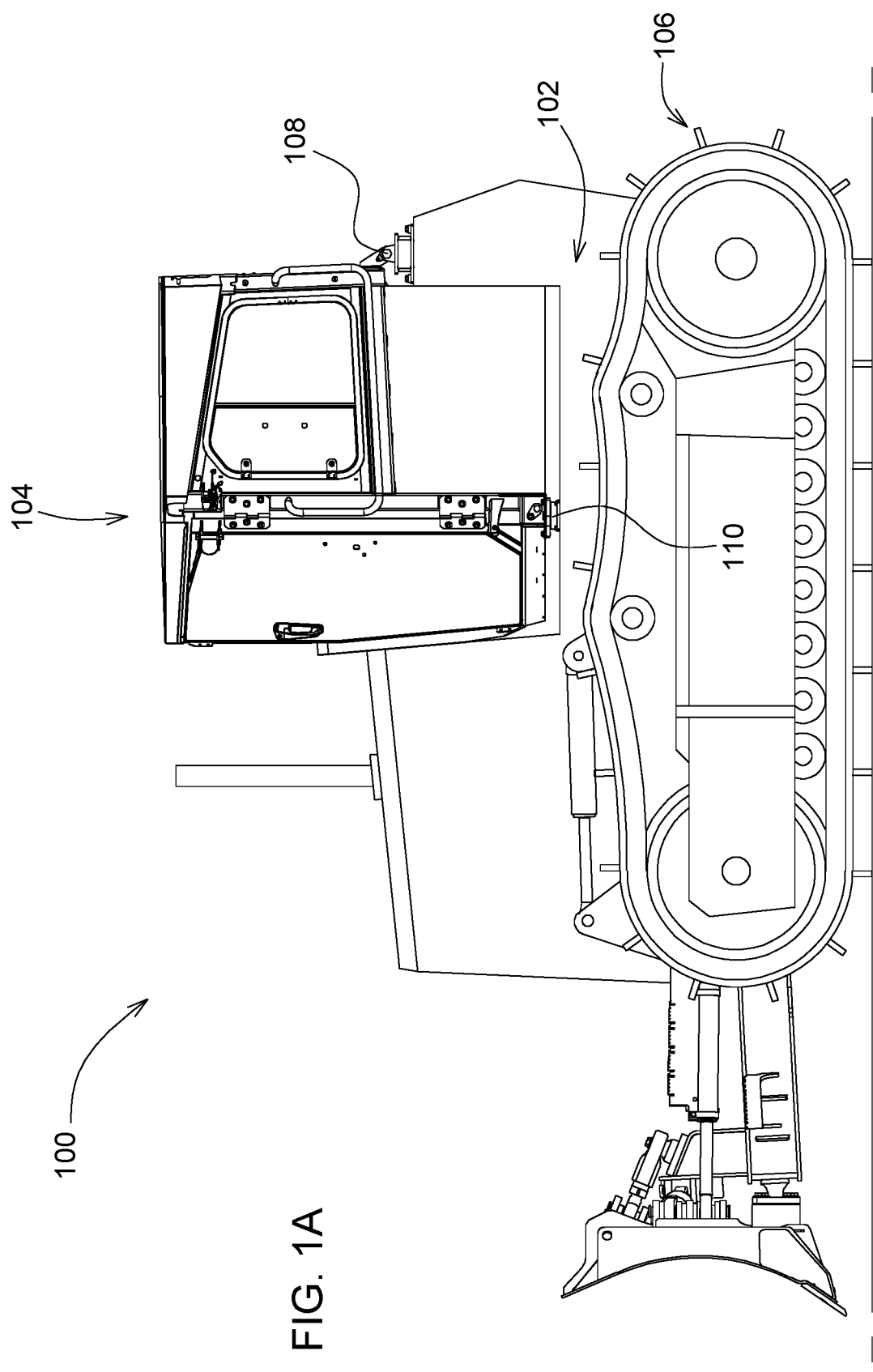
FIG. 1A is a left side elevation view of a vehicle with a cab in an operation position.

FIG. 1A illustrates vehicle 100, for example a crawler, comprising frame 102, cab 104, tracks 106, tiltable cab mount 108, and disconnectable cab mount 110. Although vehicle 100 is illustrated as a crawler, it could be any vehicle with a tiltable cab.

Frame 102 provides support and structure for vehicle 100, and may also be referred to as a chassis or mainframe. Vehicle 100 is supported by tracks 106, which engage the ground surface. Tracks 106 may be metal or rubber tracks which travel around multiple rollers to provide traction for vehicle 100. Cab 104 connects to frame 102 via cab mount 108 located at the rear of cab 104 and is selectively connected to frame 102 via cab mount 110. As used herein, "connect," and conjugations thereof, includes both direct connections and indirect connections which include intermediate components. In FIG. 1A, cab 104 is positioned in an operation position, the position of the cab when vehicle 100 is in normal operation such as when vehicle 100 is grading a surface. In the embodiment in FIG. 1A, the floor of cab 104 is positioned approximately parallel to frame 102, tracks 106, and the ground when cab 104 is in the operation position. If vehicle 100 is not moving and cab 104 is in the operation position, vehicle 100 may be referred to as at rest or in a resting position.

In addition to its tiltable connection to frame 102 via cab mount 108, cab 104 selectively connects to frame 102 via cab mount 110 positioned near the front of cab 104. Cab mount 110 provides an additional connection between frame 102 and cab 104 to prevent cab 104 from tilting relative to frame 102 via cab mount 108 when cab 104 is in the operation position. Selective cab mount 110 may connect frame 102 and cab 104 through connecting mechanisms well known in the art, such as fasteners (e.g., bolts and nuts), latches, pins, and locks, to name but a few possible selective connecting mechanisms, and may differ in design from cab mount 108. As but one example, selective mount 110 may comprise a rubber toroid positioned between a flat portion of cab 104 and a parallel flat portion of frame 102, with a bolt traversing these three components and fastened with a nut to compress the toroid and prevent lateral movement of the flat portions.

Vehicle 100 may include a roll-over protection structure or system (ROPS) comprising cab 104, cab mount 108, and cab mount 110. Some embodiments may utilize multiple mounts, for example four, to provide four load paths for the ROPS, and only some of these mounts may comprise cab mount 108 while the other mounts may comprise selective cab mount 110 or different designs. For example, vehicle 100 comprises two of cab mount 108 connected to cab 104 near the rear-left portion of cab 104 and rear-right portion of cab 104 (see FIGS. 2A, 2B), and two of selective cab mount 110 connected on the left and right portions of cab 104 (see FIG. 2B).

FIG. 1B illustrates vehicle 100 with cab 104 in a service position. Cab 104 may tilt relative to frame 102 about cab mount 108 to move into the service position and thereby provide an opening which may improve access to certain areas of vehicle 100. Vehicle 100 may comprise a number of components, such as electrical, hydraulic, and engine components and accessories, which are located beneath, or blocked by, cab 104 when cab 104 is in the operation position. Placement of components in this area may improve the overall packaging of vehicle 100 or position such components in a desirable proximity to other components. This component placement may decrease the ease with which such components are accessed, such as for maintenance and service. To improve access to such components, cab 104 may tilt relative to frame 102 into the service position to improve access to these components, which may be located on the bottom of cab 104, beneath cab 104, or blocked by cab 104 when cab 104 is in the operation position.

To move cab 104 from the operation position to the service position, any mounts connecting cab 104 to frame 102, besides cab mount 108 and any additional tiltable mounts, are disconnected. In the embodiment illustrated in the figures, two of selective cab mount 110 must be disconnected. Additional items such as wiring harnesses and hydraulic hoses may also need to be disconnected or repositioned. In certain embodiments, such additional items may be routed to cab 104 near the axis about which cab 104 rotates, or with sufficient slack so that they do not need to be disconnected when cab 104 is positioned in the service position. After the mounts and additional items are disconnected, cab 104 may be tilted about cab mount 108. Additional components may be included to assist in tilting cab 104 from the operation position to the service position and to maintain cab 104 in the service position. For example, pneumatic or hydraulic cylinders may pivotally connect to frame 102 and pivotally connect to cab 104. Expansion of the cylinders may aid in moving cab 104 from the operation position to the service position, the cylinders may aid in maintaining cab 104 in the service position, and retraction of the cylinders may aid in moving cab 104 from the service position to the operation position.

Figure 2A:
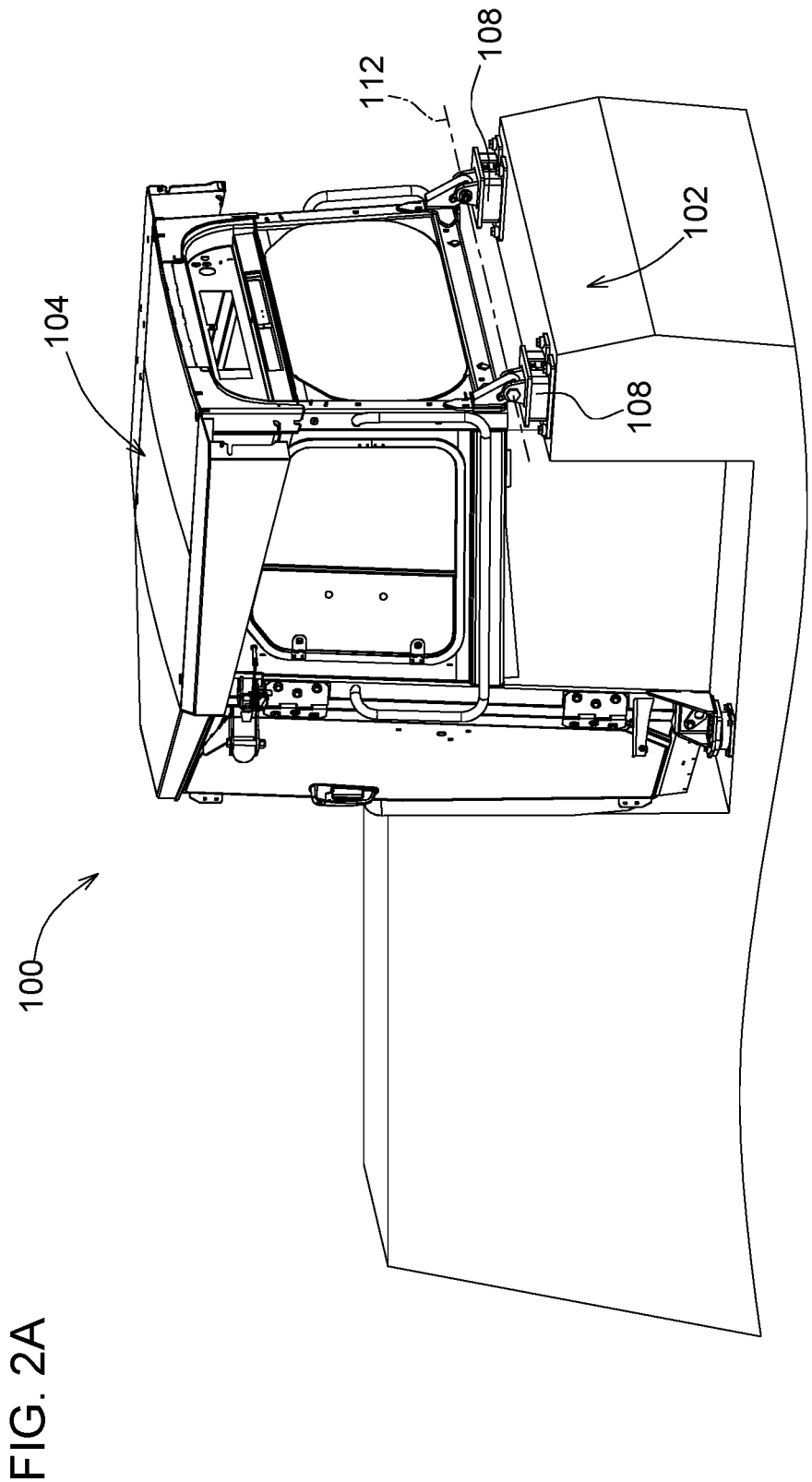
FIG. 2A is a perspective view of a portion of the vehicle with the cab in the operation position.

FIG. 2A illustrates a portion of vehicle 100 with cab 104 in the operation position. In the embodiment in FIG. 2A, there is a cab mount 108 positioned near the left side of vehicle 100 and attached to the rear of cab 104, and a cab mount 108 positioned near the right side of vehicle 100 and attached to the rear of cab 104. Each cab mount 108 is positioned on vehicle 100 such that each pivots about a common axis, axis 112, when cab 104 is moved from the operation position to the service position. Embodiments using more than one cab mount 108 may configure each cab mount 108 to have a co-axial pin so as to enable rotation about a common axis. For these embodiments, including the embodiment illustrated in the figures, this does not require perfect co-axial alignment for each pin in each cab mount 108 about the common axis, but instead requires only approximate alignment within the axial tolerances of cab mount 108, including the movement permitted by viscous isolator 114 of each cab mount 108 (see FIGS. 3A, 3B).

Figure 2B:
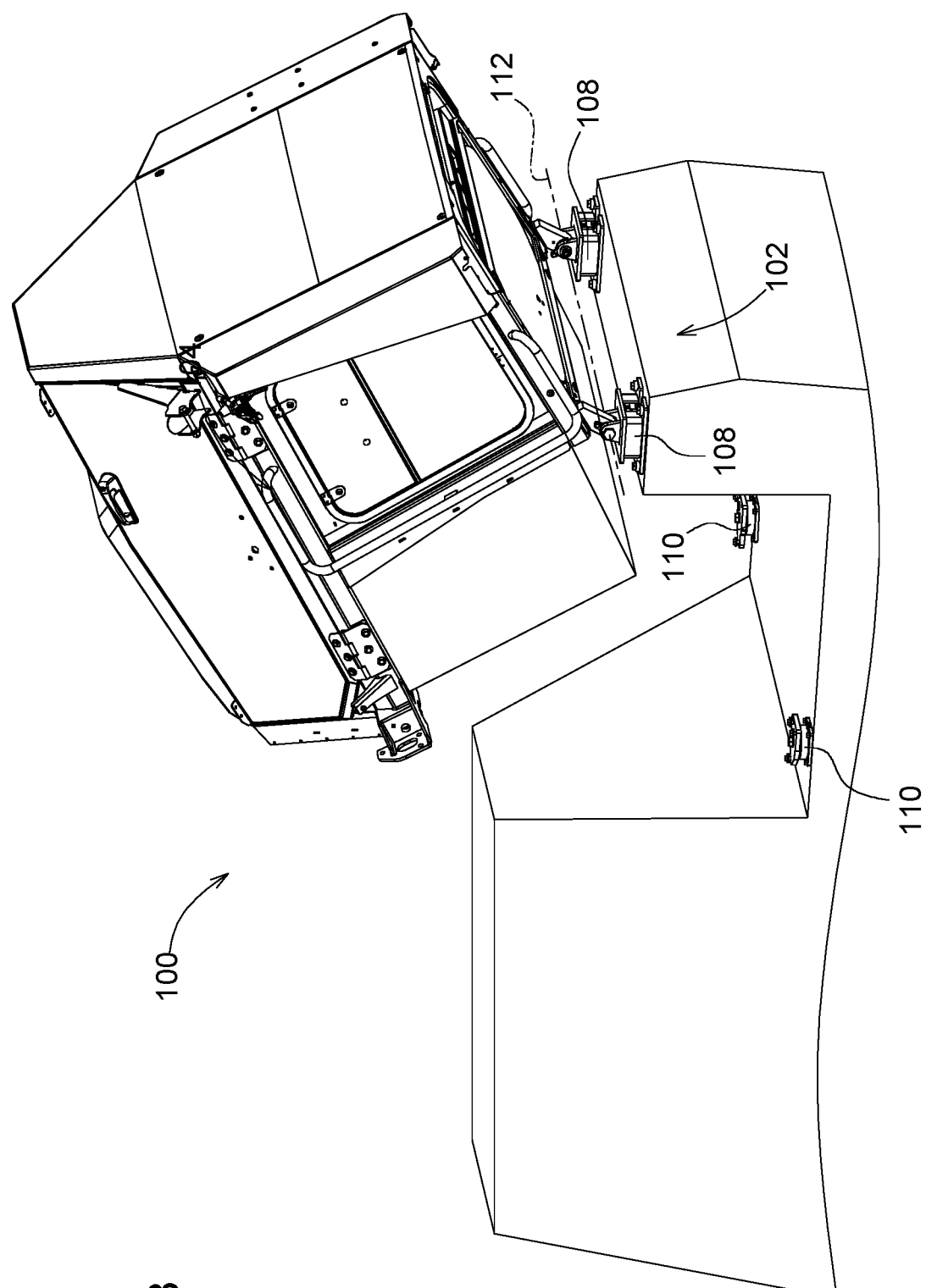
FIG. 2B is a perspective view of a portion of the vehicle with the cab in the service position.

FIG. 2B illustrates a portion of vehicle 100 with cab 104 in the service position. Cab 104 is rotated about axis 112 to move from the operation position to the service position, and this rotation exposes the area underneath cab 104.

Figure 3B:
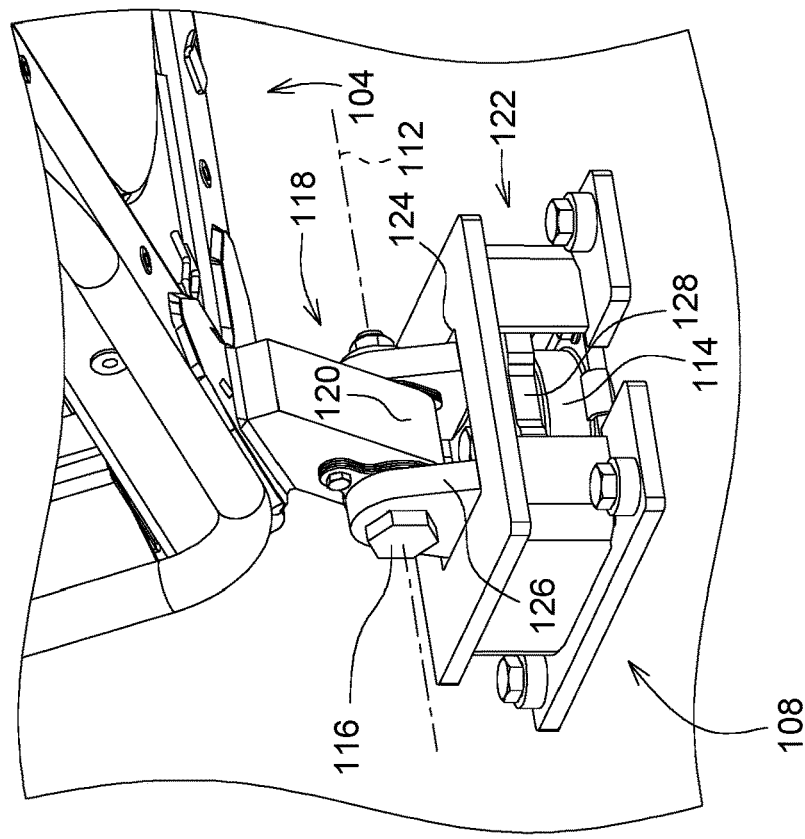
FIG. 3B is a perspective view of a portion of the vehicle with the cab in the service position, illustrating the cab mount.
Figure 3A:
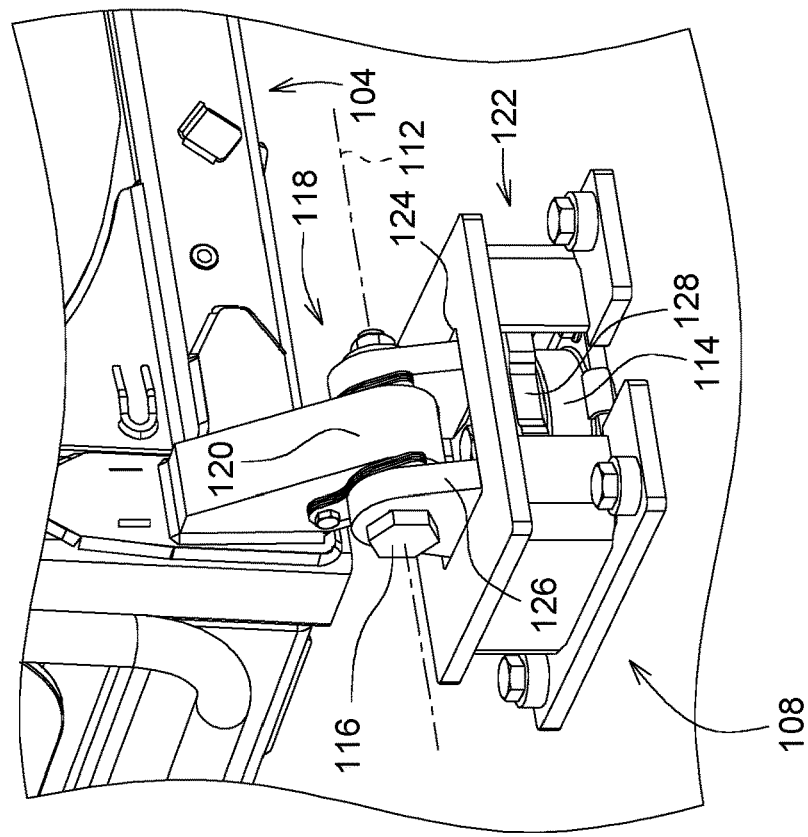
FIG. 3A is a perspective view of a portion of the vehicle with the cab in the operation position, illustrating a cab mount.

FIG. 3A illustrates cab mount 108 with cab 104 in the operation position and FIG. 3B illustrates cab mount 108 with cab 104 in the service position. Cab mount 108 comprises viscous isolator 114, pin 116, first pin receptor 118, second pin receptor 120, and retainer 122. Viscous isolator 114 is detachably mounted to frame 102 via fasteners, in this embodiment bolts. First pin receptor 118 is detachably mounted to viscous isolator 114 via a fastener, in this embodiment a bolt. Retainer 122 is detachably mounted to frame 102 via fasteners, in this embodiment four bolts.

By necessity, retainer 122 is assembled to frame 102 after viscous isolator 114 was assembled to frame 102 and first pin receptor 118 was assembled to viscous isolator 114, as retainer 122 surrounds and retains a portion of first pin receptor 118 within an area bounded by frame 102 and retainer 122. More specifically, retainer 122 comprises an aperture 124 on its top wall which provides a window to the interior of retainer 122, such that when retainer 122 is assembled to frame 102, a top portion 126 of first pin receptor 118 protrudes through aperture 124 while a base portion 128 remains retained within retainer 122 and below aperture 124. Base portion 128 and aperture 124 are configured and dimensioned such that base portion 128 is not able to pass through aperture 124, unlike top portion 126. This configuration may also be referred to as base portion 128 being "larger" than aperture 124. Unable to pass through aperture 124 or any other aperture formed from the cooperation of retainer 122 and frame 102, base portion 128 is retained by retainer 122 and frame 102 once retainer 122 is assembled to frame 102. Base portion 128 therefore cannot be removed from within retainer 122 without first detaching retainer 122 from frame 102.

First pin receptor 118 receives pin 116 such that pin 116 is oriented approximately perpendicular to the direction of travel for vehicle 100 and parallel to the top surface of frame 102 nearest pin 116. Pin 116 is also received by second pin receptor 120. Second pin receptor 120 is mounted to the rear of cab 104, in this case attached by welds, and projects rearward from cab 104. Pin 116 defines axis 112, which traverses first pin receptor 118 and second pin receptor 120. When cab 104 is moved between operation and service positions it rotates about pin 116 and about axis 112 relative to frame 102, and is thus tilted about axis 112. As can be seen from FIG. 3A and FIG. 3B, cab mount 108 enables cab 104 to be tilted more than 45 degrees between operation and service positions.

Viscous isolator 114 is a viscous isolator configured such that first pin receptor 118, second pin receptor 120, and cab 104 are movable within a limited range relative to frame 102. While movable within a limited range, viscous isolator 114 resists or damps such motion, and tends to return to a neutral position when external forces cease, for example when vehicle 100 is at rest. This viscous property may provide suspension or isolation for cab 104, which is connected to frame 102 via two of viscous isolator 114, allowing cab 104 to move more smoothly with fewer vibrations and sudden accelerations than frame 102. Viscous isolator 114 is referred to as a "viscous isolator" herein, but may also be referred to as an isolator, isolator mount, damping mount, damper, suspension, strut, or shock absorber.

FIG. 4A is a partially exploded view of cab mount 108 with pin 116 removed and cab 104 in the operation position, while FIG. 4B illustrates the same except with cab 104 in the service position.

First pin receptor 118 comprises top portion 126 and base portion 128. In the embodiment illustrated in the figures, top portion 126 is comprised of first ear 126a and second ear 126b, and base portion 128 is comprised of a single baseplate. Each of first ear 126a and second ear 126b receives pin 116 and each is welded, parallel to each other, to base portion 128 to form a rigid weldment, such that first pin receptor 118 may also be referred to as a clevis. While this embodiment utilizes a clevis for first pin receptor 118 and a single ear (third ear 120a) for second pin receptor 120, alternate embodiments could have a single or multiple ears on either side of the joint depending on the application.

When cab mount 108 is assembled, a clearance exists between first pin receptor 118 and retainer 122. This clearance permits viscous isolator 114 to damp motion of cab 104 (relative to frame 102) over a range of motion without first pin receptor 118 contacting second pin receptor 120. This clearance may vary depending on the application, but in the embodiment illustrated in the figures the minimum clearance may be greater than 4 millimeters is all direction to provide a sufficient range over which movement of cab 104 relative to frame 102 is damped.

Retainer 122 comprises bolt plate 130, wall 132, and retainer plate 134. Bolt plate 130 is mounted to frame 102 via multiple fasteners, in this embodiment four bolts. Wall 132 is connected to bolt plate 130 and protrudes upwards from bolt plate 130 towards cab 104. In this embodiment, wall 132 comprises multiple pieces welded to bolt plate 130 but in alternative embodiments this may be a single piece, and wall 132 may be fixedly connected to bolt plate 130 (such as by welds) or detachably connected (such as by bolts or other fasteners). Retainer plate 134 is connected to wall 132, and includes aperture 124. Retainer plate 134 also uses welds to connect to wall 132, but alternative embodiments may use alternative connection methods.

Cab mount 108 permits cab 104 to be tiltably mounted to frame 102 such that movement of cab 104 relative to frame 102 is damped through a first load path (frame 102 to viscous isolator 114 to first pin receptor 118 to pin 116 to second pin receptor 120 to cab 104) while still having a second load path (frame 102 to retainer 122 to first pin receptor 118 to pin 116 to second pin receptor 120 to cab 104) available when forces on cab 104 exceed a threshold. In this way, retainer 122 can provide a load path for the ROPS of vehicle 100, without interfering with the damping of cab 104 via viscous isolator 114 when vehicle 100 is operating normally. Cab mount 108 also allows cab 104 to be moved from the operation position (see FIG. 1A) to the service position (see FIG. 1B) without the need to alter cab mount 108 such as by unfastening bolts or moving a bolt or pin from one position to another. Cab 104 may rotate about axis 112 and remain connected to frame 102 via viscous isolator 114 and may also connect to frame 102 via retainer 122 (if necessary) when being tilted to the service position.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A vehicle comprising:
   a frame;
   a viscous isolator mounted to the frame;
   a first pin receptor comprising a base portion and a top portion, the base portion mounted to the viscous isolator, the top portion movable within a limited range relative to the frame;
   a retainer comprising an aperture, the retainer detachably mounted to the frame with the top portion protruding through the aperture and the base portion below the aperture;
   a cab comprising a second pin receptor; and
   a pin received by the top portion and the second pin receptor, the cab tiltable relative to the frame about the pin;
   wherein the aperture and the base portion are configured such that the base portion cannot pass through the aperture.

2. The vehicle of claim 1, wherein the top portion comprises a first ear and a second ear, the base portion comprises a baseplate, and the first ear and the second ear are positioned parallel to each other, each connect to the baseplate, and each receives the pin.

3. The vehicle of claim 1, wherein the viscous isolator is a first viscous isolator, the base portion is a first base portion, the top portion is a first top portion, the retainer is a first retainer, the aperture is a first aperture, and the pin is a first pin, the vehicle further comprising:
   a second viscous isolator mounted to the frame;
   a third pin receptor comprising a second base portion and a second top portion, the second base portion mounted to the second viscous isolator, the second top portion movable within a limited range relative to the frame;
   a second retainer comprising a second aperture, the second retainer detachably mounted to the frame with the second top portion protruding through the second aperture and the second base portion below the second aperture;
   a cab comprising a fourth pin receptor; and
   a second pin received by the second top portion and the fourth pin receptor, the cab tiltable relative to the frame about the second pin;
   wherein:
   the second aperture and the second base portion are configured such that the second base portion cannot pass through the second aperture; and
   the first pin and the second pin are co-axial.

4. The vehicle of claim 1, wherein the minimum clearance between the first pin receptor and the retainer when the vehicle is at rest is greater than zero.

5. The vehicle of claim 1, wherein the minimum clearance between the first pin receptor and the retainer when the vehicle is at rest is greater than 4 millimeters.

6. The vehicle of claim 1, wherein the cab may rotate 45 degrees without either of the first pin receptor and the second pin receptor contacting the retainer.

7. The vehicle of claim 1, wherein the retainer comprises:
a bolt plate, the bolt plate mounted to the frame via multiple fasteners;
a wall, the wall connected to the bolt plate and protruding upwards from the bolt plate; and
a retainer plate connected to the wall, the aperture included in the retainer plate.

8. A vehicle comprising:
a frame;
a viscous isolator mounted to the frame;
a first pin receptor comprising a base portion and a top portion, the base portion mounted to the viscous isolator, the top portion movable within a limited range relative to the frame;
a cab comprising a second pin receptor;
a pin received by the top portion and the second pin receptor, the cab tiltable relative to the frame about the pin; and
a retainer detachably mounted to the frame surrounding the base portion, the retainer and frame cooperating to retain the base portion between the retainer and the frame such that the base portion may not be removed from the retainer without detaching the retainer from the frame;
wherein the top portion comprises a first ear and a second ear, the base portion comprises a baseplate, and the first ear and the second ear are positioned parallel to each other, each connect to the baseplate, and each receive the pin.

9. The vehicle of claim 8, wherein the viscous isolator is a first viscous isolator, the base portion is a first base portion, the top portion is a first top portion, the retainer is a first retainer, and the pin is a first pin, the vehicle further comprising:
a second viscous isolator mounted to the frame;
a third pin receptor comprising a second base portion and a second top portion, the second base portion mounted to the second viscous isolator, the second top portion movable within a limited range relative to the frame;
a cab comprising a fourth pin receptor;
a second pin received by the second top portion and the fourth pin receptor, the cab tiltable relative to the frame about the second pin; and
a second retainer detachably mounted to the frame surrounding the second base portion, the second retainer and frame cooperating to retain the second base portion between the second retainer and frame such that the second base portion may not be removed from the second retainer without detaching the second retainer from the frame;
wherein the first pin and the second pin are co-axial.

10. The vehicle of claim 8, wherein the minimum clearance between the first pin receptor and the retainer when the vehicle is at rest is greater than zero.

11. The vehicle of claim 8, wherein the minimum clearance between the first pin receptor and the retainer when the vehicle is at rest is greater than 4 millimeters.

12. The vehicle of claim 8, wherein the cab may rotate 45 degrees without either of the first pin receptor and the second pin receptor contacting the retainer.

13. The vehicle of claim 8, wherein the retainer comprises:
a bolt plate, the bolt plate mounted to the frame via multiple fasteners;
a wall, the wall connected to the bolt plate and protruding upwards from the bolt plate; and
a retainer plate connected to the wall;
wherein the wall, the retainer plate, and the frame cooperate to retain the base portion between the retainer plate, the wall, and the frame such that the base portion may not be removed from the retainer without detaching the retainer from the frame.

14. A vehicle comprising:
a frame;
a viscous isolator mounted to the frame;
a clevis comprising a first ear, a second ear, and a baseplate, each of the first ear and the second ear connected to the baseplate, the baseplate mounted to the viscous isolator, the first ear and the second ear each movable within a limited range relative to the frame;
a cab comprising a third ear;
a pin received by the first ear, second ear, and third ear, the cab tiltable relative to the frame about the pin; and
a retainer detachably mounted to the frame, the retainer comprising an aperture, the retainer and the frame cooperating to surround the baseplate, the aperture and baseplate configured such that the baseplate cannot pass through the aperture;
wherein the cab may rotate 45 degrees without either of the clevis and the third ear contacting the retainer.

15. The vehicle of claim 14, wherein the viscous isolator is a first viscous isolator, the clevis is a first clevis, the baseplate is a first clevis baseplate, the pin is a first pin, the retainer is a first retainer, and the aperture is a first aperture, the vehicle further comprising:
a second viscous isolator connected to the frame;
a second clevis comprising a fourth ear, a fifth ear, and a second clevis baseplate, each of the fourth ear and the fifth ear connected to the second clevis baseplate, the second clevis baseplate mounted to the second viscous isolator, the fourth ear and the fifth ear each movable within a limited range relative to the frame;
a cab comprising a sixth ear;
a second pin received by the fourth ear, fifth ear, and sixth ear, the cab tiltable relative to the frame about the second pin; and
a second retainer detachably mounted to the frame, the second retainer comprising a second aperture, the second retainer and the frame cooperating to surround the second clevis baseplate, the second aperture and second clevis baseplate configured such that the second clevis baseplate cannot pass through the second aperture;
wherein the first pin and the second pin are co-axial.

16. The vehicle of claim 14, wherein the minimum clearance between the clevis and the retainer when the vehicle is at rest is greater than zero.

17. The vehicle of claim 14, wherein the minimum clearance between the clevis and the retainer when the vehicle is at rest is greater than 4 millimeters.

18. The vehicle of claim 14, wherein the retainer comprises:
a bolt plate, the bolt plate mounted to the frame via multiple fasteners;
a wall, the wall connected to the bolt plate and protruding upwards from the bolt plate; and
a retainer plate connected to the wall, the aperture included in the retainer plate.

* * * * *